April 11, 1944. W. KIERSTED, JR 2,346,491
SOLVENT SEPARATION OF LIQUID MIXTURES
Filed Aug. 12, 1941
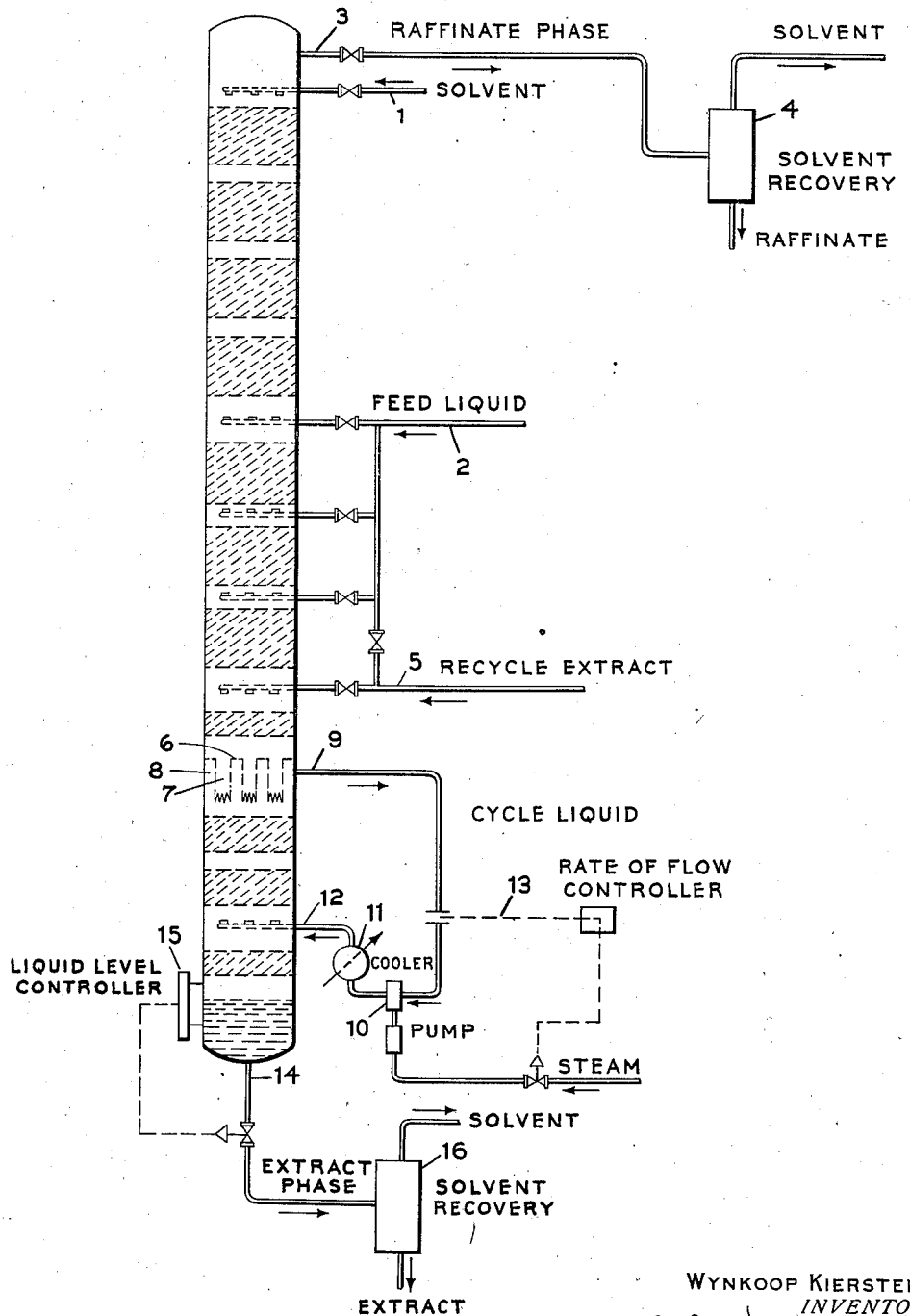
WYNKOOP KIERSTED, JR.
INVENTOR
BY
HIS ATTORNEYS Patented Apr. 11, 1944

2,346,491

UNITED STATES PATENT OFFICE 2,346,491

SOLVENT SEPARATION OF LIQUID MIXTURES

Wynkoop Kiersted, Jr., Scarsdale, N. Y., assignor, by mesne assignments, to The Texas Company, New York, N. Y., a corporation of Delaware Application August 12, 1941, Serial No. 406,478

8 Claims. (Cl. 196—13)

This invention relates to solvent separation of liquid mixtures wherein the mixture is separated into its components by solvent extraction.

In accordance with the invention, feed liquid and solvent liquid are subjected to contact in an extraction zone so as to form raffinate and extract phases. The raffinate phase is rich in the insoluble component or components of the feed liquid, while the extract phase comprises a large proportion of solvent liquid containing the soluble component or components of the feed liquid as well as some of the less soluble raffinate component.

The extract phase is passed through rectifying and washing zones advantageously with decreasing temperature so as to release retained raffinate component from the extract phase and thereby obtain a final extract phase consisting essentially of solvent and extract component. The so-treated extract phase and the raffinate phase are separately withdrawn and the solvent removed therefrom to produce an ultimate raffinate and an ultimate extract.

As will be described in more detail, in carrying out the process of the invention the extract phase is advantageously subjected to contact with a recycled portion of the ultimate extract during passage through the rectifying zone, and during passage through a separate washing zone is subjected to intimate contact with a body of recycled raffinate component under conditions adapted to enrich the extract phase in the extract component and denude it of raffinate component.

The process of the invention is particularly applicable to the treatment of mixtures such as mineral oils—for example, the treatment of lubricating oil stock, to effect separation between relatively paraffinic and relatively non-paraffinic constituents. In this latter case the separated paraffinic fraction will be characterized by having a relatively high viscosity index and will be relatively free from unsaturated and naphthenic constituents.

The process of the invention is also applicable to the treatment of other substances such as fatty oils and fatty acids of animal or vegetable origin to effect separation between saturated and unsaturated constituents.

It has been proposed heretofore in the extraction of mineral oil, for example, to effect such extraction in a packed tower having provision for cooling of the extract phase and for recycling a portion of the extract or extract material to the extraction tower for the purpose of supplying a back wash. Such provision is disclosed, for example, in U. S. 2,081,720, granted to W. J. D. Van Dijck.

The present invention includes provision for subjecting the extract phase following such back wash treatment, or in conjunction with such back wash treatment, to contact with a body of oil phase withdrawn and recycled from a preceding stage in the extraction process. The contact is effected under conditions adapted to concentrate heavy extract material in the ultimate extract phase solution discharged from the process.

In extracting mineral oil with a selective solvent the extract phase formed in the extraction zone usually contains substantial amounts of relatively paraffinic oil or oil of intermediate character soluble in the solvent. Therefore, it is necessary to subject the extract phase so formed to a rectifying treatment for the purpose of separating this retained paraffinic oil. This separation may be accomplished to some extent by subjecting the mixture to settling at a reduced temperature so that the retained paraffinic oil is precipitated or separated from solution. In an extraction tower type of operation this retained raffinate oil of intermediate character so precipitated separates in a finely divided and uniformly dispersed state and difficulty is experienced in securing rapid and effective separation of the precipitated oil from the interphase region of the tower.

This region comprises a horizontal interphase between extract phase proper and separated oil and it comprises a liquid mass consisting largely of oil globules somewhat similar to those which appear in an oil-water interphase after a mixture of oil and water has been subjected to violent agitation. The droplets of precipitated raffinate oil separate slowly from this mass and the total amount of precipitated oil is small relative to the volume of extract solution. As a consequence in the usual operation complete separation is not realized and therefore a substantial amount of this raffinate oil remains entrained in the extract solution and passes from the extraction tower in the extract phase solution to the solvent recovery system.

The present invention provides a means for facilitating the rapid and efficient separation of the precipitated intermediate oil from the extract solution, and for transferring the separated intermediate oil to the proper point in the extraction tower so that it is ultimately withdrawn in the raffinate phase.

The invention involves effecting the extractive treatment in three stages or zones: (1) a refining or extraction zone from which a final raffinate phase is withdrawn; (2) a rectifying zone through which the extract phase formed in the extraction zone is passed and wherein it is brought into contact with a body of recycled extract; and (3) a washing zone to which the extract phase mixture passes from the rectifying zone. In the washing zone the extract mixture is brought into countercurrent contact with a stream of recycled intermediate raffinate so as to remove from the extract solution the droplets of precipitated raffinate substantially as rapidly as they are formed.

Advantageously, the washing zone is maintained at a substantially lower temperature than that prevailing in the extraction zone. Moreover, it is advantageous to maintain a progressively decreasing temperature through each zone. The temperature differential existing in the extraction zone may be maintained by suitable adjustment and control of the temperatures of the entering feed liquid solvent liquid, while the temperature in the washing zone is advantageously maintained by cooling the recycled stream of intermediate raffinate prior to its return to the washing zone.

Cooling the extract solution precipitates the least soluble but nevertheless valuable raffinate components. Also introduction of extract into the rectifying zone assists in this precipitation. An important advantage of the present invention resides in effecting separation of the precipitated material from the extract solution: (1) by subjecting the solution to contact with upwardly flowing recirculated raffinate; (2) by reducing the depth of extract solution to film proportions due to the presence of Raschig rings or other packing material in the precipitating zone; and (3) by maintaining conditions within the separating and precipitating zone of the extraction tower which favor increase in the size of the precipitated droplets.

The avoidance of violent agitation of the cooled extract solution contributes substantially to realizing efficient separation of the precipitated raffinate droplets.

In order to describe the invention in more detail reference will now be made to the accompanying drawing showing one mode of applying the invention to the solvent extraction of mineral lubricating oil.

As shown in the drawing the extraction operation is carried out in a single vertical extraction tower packed with a plurality of nests of packing material such as Raschig rings.

The solvent liquid in a heated condition is introduced to the upper portion of the extraction tower through a pipe 1 while the feed liquid mixture is introduced to the tower through a pipe 2 so that it enters the tower at a point substantially below that at which the solvent is introduced. This section of the extraction tower between the points of solvent and feed liquid entry comprises the extraction or refining zone. In operation there is countercurrent flow of the solvent and the feed liquid through the extraction zone so that formation of raffinate and extract phases occurs. The raffinate phase comprising a small amount of solvent mixed with the insoluble raffinate component of the feed mixture accumulates in the top of the extraction tower wherein provision is made for adequate settling space.

The raffinate phase is continuously withdrawn from the top of the tower through a pipe 3 leading to a solvent recovery unit 4 wherein the solvent is recovered from the raffinate component of the feed mixture.

The extract phase formed in the extraction zone usually comprises the bulk of the solvent liquid having dissolved therein the soluble or extract component of the feed mixture and containing some of the raffinate component.

This extract phase solution now passes into a lower portion of the extraction tower comprising the rectifying zone.

A portion of the ultimate extract, and from which the solvent has advantageously been stripped, is introduced through a pipe 5 to the lower portion, or bottom, of the rectifying zone of the tower. The recycled extract, being free from solvent, upon reintroduction to the extraction tower is preferentially soluble in the solvent liquid existing at this point in the extraction tower. Consequently, the solvent preferentially dissolves the recycled extract and in doing so releases from solution retained raffinate which upon release rises through the rectifying zone toward the extraction zone.

The resulting mixture of extract phase containing recycled extract passes from the rectifying zone to a still lower portion of the tower comprising a washing zone.

A partition 6 extends horizontally across the interior cross-section of the tower and is provided with a plurality of orifices opening into corresponding downflow pipes 7.

The extract phase mixture flows downwardly through the downflow pipes 7 and is distributed by these pipes over the packing immediately below.

The space 8 surrounding the downflow pipes and beneath the partition 6 provides a settling space, in the upper portion of which accumulates intermediate raffinate precipitated or separated from solution in the washing zone and which rises through the washing zone.

A portion of this separated raffinate accumulating in the upper portion of the settling space 8 is continuously withdrawn through a pipe 9 and returned by means of a pump 10 through a cooler 11 and pipe 12 to the lower portion of the washing zone.

A rate of flow controller 13 may be provided as indicated for the purpose of controlling the supply of steam to the pump 10 and in this way facilitate the maintaining of a constant rate of withdrawal through the pipe 9.

The recycled raffinate introduced through the pipe 12, being reduced in temperature, subjects the extract phase mixture flowing downwardly through the washing zone to cooling in a countercurrent manner. As a consequence, dissolved raffinate is precipitated from the downwardly flowing solution and the resulting globules of precipitated raffinate are swept upwardly by the upwardly flowing stream of recycled liquid.

The surplus of the separated raffinate accumulating in the space 8 escapes by passage upwardly through the downflow pipe 7, the lower extremities of which are advantageously serrated or notched.

The extract solution rich in extract component and substantially free from raffinate component accumulates in the bottom of the tower and is continuously withdrawn therefrom through a pipe 14. A liquid level controller 15 may be provided so as to maintain a substantially constant extract phase level in the bottom of the tower.

The withdrawn extract phase is conducted to a solvent recovery unit 16 wherein the solvent is removed from the extract component.

As indicated in the drawing nests of Raschig rings or other packing material are provided in the rectifying and washing zones. The packing material provides an extended surface facilitating rapid and effective separation between retained raffinate component and the extract phase solution. In other words, it reduces the depth of extract solution through which precipitated raffinate component in the form of globules or droplets must pass in order to join the raffinate phase.

Rapid precipitation of raffinate component from the extract phase solution insures large droplets and hence improves separation of the phases.

While a single extraction tower has been described, nevertheless it is contemplated that the operation may be carried out with a plurality of separate extraction towers. For example, the above-mentioned extraction and rectifying zones may be maintained in one tower while the washing zone is maintained in a separate tower. The employment of separate towers in this latter manner eliminates the necessity for providing the downflow pipes 7 illustrated in the drawing and which are necessary in a single extraction tower apparatus in order to provide means for withdrawing raffinate component from an intermediate point in the tower.

When employing the invention in the extraction of lubricating oil stock with solvent comprising furfural, the oil is introduced to the tower through the pipe 2 at a temperature of about 110° F., while the solvent is introduced through the pipe 1 at a temperature of about 250° F.

The solvent is introduced to the tower in the proportion of about 2 parts of furfural to 1 part of oil.

Operations are adjusted so as to maintain a temperature differential of about 50° F. or in the range about 40 to 60° F. through the extraction zone between the point of furfural entry and the point of oil entry. A somewhat smaller temperature differential may be maintained throughout the rectifying zone, for example, of the order of about 5° F. On the other hand it is desirable to employ a temperature differential of about 45° F. or a differential in the range of about 30 to 55° F. throughout the washing zone.

In extracting oil with furfural as above described the extraction zone advantageously comprises four nests of Raschig rings, each nest being about 5 feet in depth. The rectifying zone advantageously comprises about three nests of similar depth.

As indicated in the drawing a nest of Raschig rings of about 2 feet in depth is located just below the point of introduction of recycled intermediate raffinate. Also two relatively shallow nests, for example, each of about 3 feet in depth, are placed in the washing zone between the points of intermediate raffinate withdrawal and return to the washing zone. In addition a nest of about 2 feet in depth is advantageously placed in the washing zone below the point of introduction of recycled intermediate raffinate.

It will be understood that the depth and number of nests of packing may be varied as desired. Also the temperatures and proportion of solvent to oil may be varied depending upon the nature of the oil or other feed liquid undergoing treatment and upon the degree of extraction desired. Thus, in the case of lubricating oil extractions the temperature of the entering solvent may be substantially below or above that mentioned, for example, in the range about 180 to 300° F. Likewise the temperature of the entering oil may be varied from that specified, for example, in the range 90 to about 150° F.

While furfural has been specifically mentioned, nevertheless it is contemplated that other selective solvents may be employed in carrying out the invention. Examples of such other solvents include phenol, chlorphenols, dichlorethyl ether, nitrobenzene, benzaldehyde, sulfur dioxide, ketones, ether compounds and derivatives of furan such as tetrafurfuryl alcohol and the like, including mixtures of two or more solvents.

It is also contemplated that the extract recycle introduced through pipe 5 may be obtained by the solvent extraction of a different grade of oil from that being charged through pipe 2. For example, the feed oil may be a distillate lubricating oil stock and the extract introduced through pipe 5 may be obtained in the separate solvent extraction or residual lubricating oil with the same or a different solvent. For that matter the extract introduced through pipe 5 may be that obtained in the extraction of the same or a different grade of oil with a different selective solvent. Thus, when extracting lubricating oil with furfural, the extract introduced through pipe 5 may comprise, at least in part, extract obtained by extracting the same or a different grade of oil with a solvent such as sulfur dioxide.

Obviously many modifications and variations of the invention as above set forth may be made without departing from the spirit and scope thereof, and therefore only such limitations should be imposed as are indicated by the appended claims.

I claim:

1. In the solvent separation of a feed liquid containing components relatively soluble in relatively insoluble in, and of intermediate solubility in the solvent to produce an ultimate solvent-free raffinate consisting essentially of insoluble component and an ultimate solvent-free extract consisting essentially of soluble component, the steps comprising subjecting feed liquid and a solvent to continuous countercurrent contact in an extraction zone to form raffinate phase containing insoluble component and extract phase rich in soluble component and containing component of intermediate solubility, said extraction zone being within a single treating tower through which the raffinate phase flows toward the raffinate phase outlet at one end and the extract phase flows toward the extract phase outlet at the opposite end, passing said extract phase through a rectifying zone in a second section of said tower beyond said extraction zone in the direction of extract phase flow, subjecting it therein to contact with a recycled portion of said ultimate extract, thereafter passing extract phase mixture containing recycled extract through a washing zone in a third section of said tower beyond said second section in the direction of extract phase flow, said third section being packed with inert contact material providing extended contact surface area, withdrawing from an initial stage in said washing zone a stream of liquid relatively rich in intermediate component, reducing the temperature of the withdrawn stream, recycling the cooled withdrawn stream without altering its composition to a succeeding stage in the washing zone in the direction of flow of extract phase through the washing zone whereby said extract phase mixture is subjected to intimate contact in the washing zone with a countercurrently flowing and relatively cool body of recycled intermediate component, withdrawing resulting washed extract phase from said washing zone, removing solvent from the withdrawn extract phase to produce said ultimate extract, withdrawing raffinate phase from the extraction zone and removing solvent therefrom to produce said ultimate raffinate.

2. In the solvent separation of a feed liquid containing components relatively soluble in relatively insoluble in, and of intermediate solubility in the solvent to produce an ultimate solvent-free raffinate consisting essentially of insoluble component and an ultimate solvent-free extract consisting essentially of soluble components, the steps comprising subjecting feed liquid and a solvent to continuous countercurrent contact in an extraction zone to form raffinate phase containing insoluble component and extract phase rich in soluble component and containing component of intermediate solubility, said extraction zone being within a single treating tower through which the raffinate phase flows toward the raffinate phase outlet at one end and the extract phase flows toward the extract phase outlet at the opposite end, passing said extract phase through a rectifying zone in a second section of said tower beyond said extraction zone in the direction of extract phase flow, subjecting it therein to contact with a recycled portion of said ultimate extract, thereafter passing extract phase mixture containing recycled extract through a washing zone in a third section of said tower beyond said second section in the direction of extract phase flow, said third section being packed with inert contact material providing extended contact surface area, withdrawing from an initial stage in said washing zone a stream of liquid relatively rich in intermediate component, recycling said withdrawn stream without altering its composition to a succeeding stage in the washing zone in the direction of flow of extract phase through the washing zone, whereby said extract mixture is subjected to intimate contact in the washing zone with a countercurrently flowing body of recycled intermediate component, decreasing the temperature of the extract mixture as it flows through the washing zone, withdrawing washed extract phase from said washing zone, removing solvent therefrom to produce said ultimate extract, withdrawing raffinate phase from the extraction zone and removing solvent therefrom to produce said ultimate raffinate.

3. In the solvent separation of a feed liquid containing components relatively soluble in, relatively insoluble in and of intermediate solubility in the solvent, to produce an ultimate solvent-free raffinate consisting essentially of insoluble component and an ultimate solvent-free extract consisting essentially of soluble component, the steps comprising continuously introducing a solvent of greater specific gravity than the feed liquid to the upper portion of an extraction tower, continuously introducing a feed liquid to said tower at a point substantially below the point of solvent entry, the section of tower between the points of solvent and feed liquid entry comprising an extraction zone, subjecting feed liquid and solvent to continuous countercurrent contact during flow through said extraction zone to form raffinate phase rich in insoluble component and extract phase rich in soluble component and containing component of intermediate solubility, passing the extract phase downwardly through a succeeding portion of the tower extending below the point of feed liquid entry, said portion comprising a rectifying zone, continuously introducing a recycled portion of said ultimate extract to the rectifying zone for commingling with the downwardly flowing extract phase, passing the commingled extract phase and recycled extract downwardly through a still lower and succeeding portion of said tower comprising a washing zone packed with inert contact material providing extended contact surface area, continuously withdrawing from the upper portion of said washing zone a stream rich in intermediate component, continuously recycling said withdrawn stream of intermediate component without altering its composition to the lower portion of said washing zone, continuously withdrawing washed extract phase from the bottom of said washing zone, removing solvent therefrom to produce said ultimate extract, continuously withdrawing raffinate phase from the extraction zone, and removing solvent from the withdrawn raffinate phase to produce said ultimate raffinate.

4. The method according to claim 3 in which the washing zone of said tower is at a substantially lower temperature than the extraction zone.

5. The method according to claim 3 in which there is a progressive decrease in temperature through each zone toward the bottom of the tower.

6. In the solvent separation of a feed liquid containing components relatively soluble in and relatively insoluble in the solvent by continuous countercurrent contact between feed liquid components and solvent in an extraction zone to form a raffinate phase rich in relatively insoluble component and an extract phase rich in relatively soluble component, said extraction zone being within a single treating tower through which the raffinate phase flows toward the raffinate phase outlet at one end and the extract phase flows toward the extract phase outlet at the opposite end, the steps comprising passing extract phase containing some raffinate component through a washing zone from an initial stage to a succeeding stage thereof wherein dissolved raffinate component is precipitated from solution and flows to the initial stage of the washing zone, said washing zone being in a section of said tower substantially beyond the extraction zone in the direction of extract phase flow and being packed with inert contact material providing extended contact surface area, withdrawing at least a substantial portion of said precipitated raffinate from said initial stage, passing the remaining portion of said precipitated raffinate from said initial stage into a section of the tower intermediate said extraction and washing zones, recycling said withdrawn portion of precipitated raffinate to said succeeding stage without altering the composition of the recycled portion, causing the recycled raffinate to flow through the washing zone countercurrently to and in intimate contact with extract phase passing through the washing zone such that said extract phase becomes progressively leaner with respect to raffinate component, discharging raffinate from the extraction zone, and discharging extract from a final stage of the washing zone.

7. The method according to claim 6 in which the recycled raffinate is subjected to cooling prior to return to said succeeding stage of the washing zone.

8. The method according to claim 6 in which solvent-free extract is commingled with the extract phase prior to passing through the washing zone.

WYNKOOP KIERSTED, JR.